Aug. 12, 1958     T. F. PETERSON     2,847,499
COAXIAL CABLE
Filed June 16, 1954
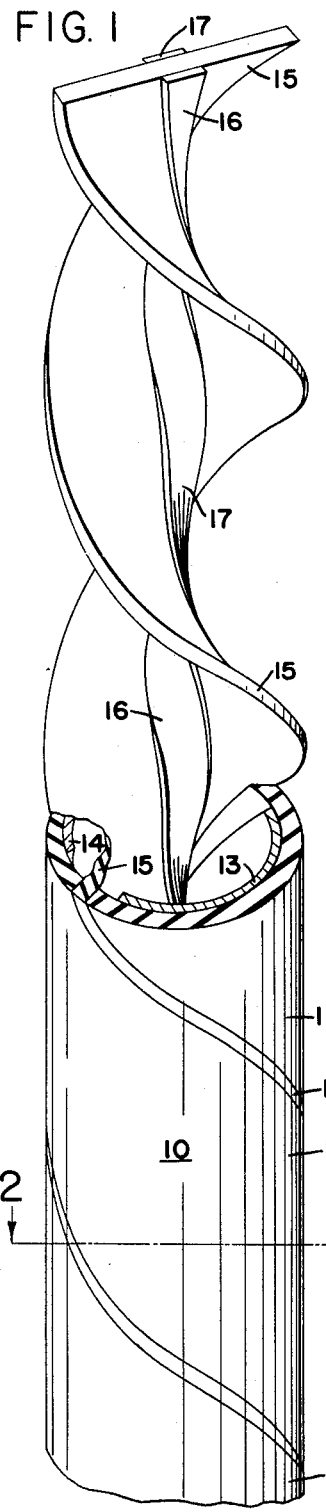
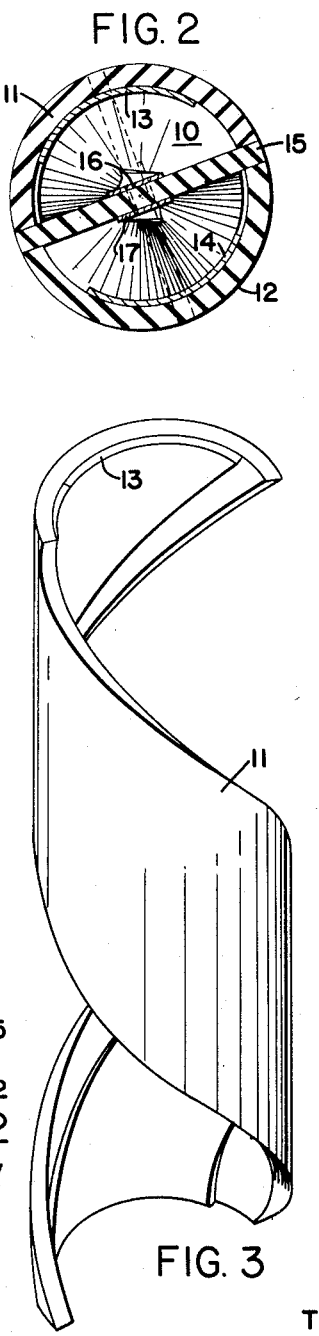
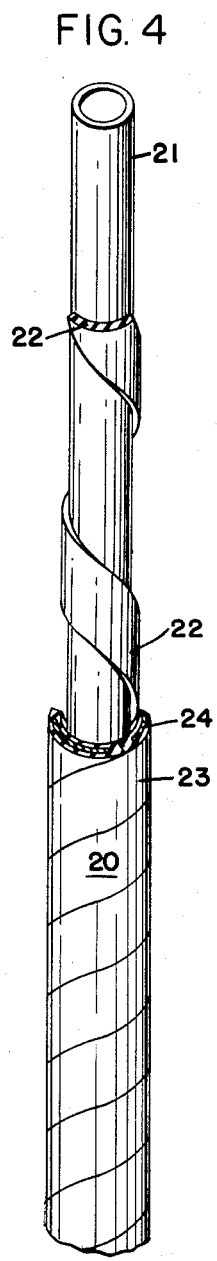
INVENTOR.
THOMAS F. PETERSON
BY
*Richard H. MacCutcheon*
ATTORNEY

United States Patent Office

2,847,499
Patented Aug. 12, 1958

2,847,499
COAXIAL CABLE

Thomas F. Peterson, Shaker Heights, Ohio, assignor to Preformed Line Products Company, Cleveland, Ohio, a corporation of Ohio Application June 16, 1954, Serial No. 437,047

3 Claims. (Cl. 174—107)

This invention relates to improvements in electric cable construction and has particular significance in connection with coaxial cables. For many applications (and especially where power is to be transmitted at the higher frequencies) low capacitance within the conducting cable is a requirement. Because the capacity decreases as the distance between the conductors increases, the minimal distance between conductors is thus dictated.

In the past it has been known to have concentric cylindrical conductors, one along the axis and the other at the periphery of a cable, with a series of beads, disc washers, support arms or other means provided at axially spaced intervals to maintain the spacing between the conductors. Such arrangements particularly for high, very high or ultra high frequency applications, have disadvantages associated with the electrical discontinuities created by the support means and have mechanical disadvantages as well. It has also been known to have three conducting strip members partially embedded in insulating material while spaced from each other primarily by air and been known to have an inner conductor, an outer tubular conductor and an intervening insulation formed as an outer tubular sleeve within the outer conductor, an inner tubular sleeve around the inner conductor, and a helically extruded web joining these tubular sleeves, but such constructions have proved difficult to fabricate as well as expensive to install and operate due to the difficulty of making splices between conducting portions and then attempting to replace the insulation intended to hold the conductors in place.

It is an object of the present invention to provide simple and inexpensive means for overcoming the above mentioned difficulties.

A further object of the invention is to provide a coaxial cable characterized by ease of fabrication, installation and operation as well as by no longitudinal discontinuities in dielectric.

Another object of the invention is to provide a low loss, easy to fabricate, easy to install, and easy to maintain coaxial cable in which the presence of solid insulating media in the field of dielectric stress set up between conductors is reduced to an insignificant value.

According to one aspect of the present invention, I provide helically formed outer insulation carrying one or more outer conductors and helically formed or twisted inner insulation adjacent one or more inner conductors coaxial with the outer conductors. The arrangement has the pronounced advantage of offering no longitudinal discontinuities in the line, while at the same time the helically formed outer insulation (as well as the inner) has the advantage of being very easy to apply during manufacture, and to remove and replace whenever it is desired to make a splice during installation or maintenance operations.

According to one embodiment illustrated herein, I use two strips of preformed helical insulation, somewhat as disclosed and described in my Patent 2,275,019 issued March 3, 1942. For convenience of description these are called "outer strips," and in accordance with the present invention they carry outer conductors and together almost form a closed tubular insulation of circular cross section. In accordance with this embodiment I also use a strip of "inner" insulation which is twisted to follow the pitch of the helix of the outer strips. This inner strip has a center portion of at least one of its transverse surfaces coated with conducting material while its edge portions are secured between edges of the helical outer strips thus providing substantially coaxial conductors, mutually insulated from one another and separated by a primarily air or gas dielectric with no longitudinal discontinuities.

According to another illustrated embodiment, a single strip of helical outer insulation is used and it carries a single outer conductor, while additional helical strip insulation separates outer insulation and a concentric inner conductor. With this arrangement the dielectric may or may not be all solid, according to the lay of the inner insulation, but in any event there are no longitudinal discontinuities and the strips are easy to apply and easy to remove.

Other objects and advantages will become apparent and the invention may be better understood from consideration of the following description taken in connection with the accompanying drawing, in which:

Fig. 1 is a view in elevation and partly broken away, and showing a coaxial cable made according to one embodiment of the invention;

Fig. 2 is a cross section taken on the line 2—2 of Fig. 1;

Fig. 3 is a view in elevation and showing one of the outer helical strips shown in Figs. 1 and 2;

Fig. 4 is a broken away view of a coaxial cable according to another embodiment of the invention.

Referring now to Figs. 1 and 2, I have shown a coaxial cable indicated generally at 10 and comprising two "outer" insulation strips, 11 and 12, respectively, each of which may be assumed preformed as an open helix having a pitch and opening between turns not only sufficient to permit application to any other parts of the cable from the side, but also sufficient to permit mating of adjacent parts as hereafter described. Each of these outer strips carries an outer conductor (13—14, respectively) glued or otherwise secured thereon. There is also an "inner" insulation strip 15 carrying adjacent a transverse center portion thereof at least one conducting strip (of which, in the illustrated embodiment, two are shown at 16, 17, respectively). The edges of insulating strip 15 are secured between the edges of the outer strips as by using thermoplastic insulation and applying heat thereto at these points, or the joints may be sealed with glue or with an elastic binder which will permit some elasticity without shear when the cable is bent.

In operation, the outer conductors 13, 14 may be connected together and to ground at intervals by connections (not shown), and the center conductors 16, 17 may be connected together at intervals and operated at high potential, but at any event those skilled in the art will recognize that the dielectric field between center and outer conductors will be primarily in a gas such as air (because the field strength along the circuitous route through the insulation will be so low as to be immaterial) and that there are no longitudinal discontinuities in the dielectric.

In Fig. 4, there is shown a coaxial cable indicated generally at 20 and comprising a tubular center conductor 21 surrounded by helically wrapped "inner" insulation 22 wound on the center conductor in a 33⅓% lay (i. e., in one piece with ⅔ spacing). This inner insulation 22 is covered by oppositely helically wrapped conductor carrying "outer" insulation 23 wound on in a 100% lay (i. e., in one piece with edges adjacent), and the outer insulation has imbedded therein the outer conductor 24 which is thus made concentric with the inner and separated therefrom by a dielectric which has no longitudinal discontinuities. As shown the dielectric is principally air but it could of course be changed to a nearly 100% solid insulation by merely increasing the percent lay of the inner insulation 22.

Various expedients are of course possible with either arrangement, and the conducting strips might be either embedded in the associated insulation (as with 24 in Fig. 4), or secured to the respective surfaces thereof (as in Fig. 1) and may be either glued, or sprayed on, or laid on, or extruded with the insulation, or secured thereon or therein by rivets, the latter expedient having only very minor disadvantages so far as longitudinal discontinuities are concerned. The so-called "conductors" may be entirely of metal or may be "semi-conducting" strips with or without supplementary metal wire, foil or strip. Alternatively, one or more of the insulating strips might be perforated or notched or bent or provided with protuberances with an associated conducting strip wound therethrough or therearound, but in any event the use of at least one conductor secured by helically disposed outer insulation strip in spaced relation to helically disposed inner insulation with at least one inner conductor secured by the latter provides a field of substantially uniform stress between conductors, with no longitudinal discontinuities and with practically any desired line capacity (depending on dimensions) so as to permit the design of an extremely low loss cable (because it can be made with low electrostatic capacity). At the same time, the structure of the invention firmly holds the conductors in spaced relation, the completed cable is flexible, easily fabricated, and inexpensive and easy to install, splice and operate.

While particular embodiments have been illustrated and described, various modifications may be made without departing from the true spirit and scope of the invention which I intend to define in the appended claims.

I claim:

1. Coaxial cable comprising in combination a plurality of helical preformed strips of outer insulation, a relatively flat strip of inner insulation given a helical twist to conform in pitch to the preformed strips, at least one conducting material layer on a central portion of at least one of the preformed strips, at least one conducting material layer carried by a center portion of the flat strip, and sealing means holding the edge portions of the flat strip between edges of the preformed strips to hold the conducting material layers in substantially coaxial arrangement with a primarily gas dielectric.

2. Coaxial cable comprising in combination a pair of outer insulation strips each preformed as an open helix having a pitch and opening between turns sufficient to permit application from the side, a pair of outer conductors secured each on one of the outer strips, an inner insulation strip having its edges secured between edges of the outer strips, and center conducting means secured to the inner insulation strip adjacent a transverse center portion of said strip.

3. Coaxial cable construction comprising at least one strip of outer insulation helically preformed by helical winding so the strip will present a half annular cross section transverse the axis of the completed cable, a strip of conducting material carried by said strip of outer insulation and extending substantially the length thereof and centrally located away from its edges, a strip of inner insulation rectangular in original cross section and helically flat twisted so that said strip will present a rectangular cross section transverse the axis of the completed cable, at least one strip of conducting material secured to said inner insulation and extending substantially the length thereof and centrally located away from its side edges, means supporting the inner insulation by securing its edges to the edges of the outer insulation to support the inner insulation and its conductor in coaxial relation with respect to the outer insulation and its conductor.

References Cited in the file of this patent

UNITED STATES PATENTS

| | | |
|---|---|---|
| 1,775,072 | Simmons | Sept. 2, 1930 |
| 2,556,244 | Weston | June 12, 1951 |
| 2,580,838 | Rhodes | Jan. 1, 1952 |
| 2,599,857 | Mildner | June 10, 1952 |
| 2,721,312 | Greig | Oct. 18, 1955 |